Patented Mar. 27, 1923.

1,449,388

UNITED STATES PATENT OFFICE.

IDA A. FERRELL, OF STAUNTON, INDIANA.

PAINT AND VARNISH REMOVING COMPOSITION.

No Drawing. Application filed July 24, 1919. Serial No. 312,925.

*To all whom it may concern:*

Be it known that I, IDA A. FERRELL, a citizen of the United States, residing at Staunton, in the county of Clay and State of Indiana, have invented new and useful Improvements in Paint and Varnish Removing Composition, of which the following is a specification.

This invention relates to a paint and varnish removing composition and the primary object of the same is to provide a composition which will be effective in removing all sorts of paint and varnish and particularly from wood surfaces without in the least modifying or discoloring such surfaces and without injury to the hands of the user. The invention consists in the ingredients or constituents which will be more fully hereinafter described and claimed in preferred proportions to attain the best results.

The composition embodies ingredients or constituents as follows:

| | |
|---|---|
| Starch | 24 oz. |
| Sodium carbonate | 3 oz. |
| Sodium chloride | 6 oz. |
| Sodium hydroxide | 7 oz. |

The starch, sodium carbonate and sodium chloride are first thoroughly mixed and after this treatment about one quart of cold water is added to these particular ingredients or constituents. Enough hot water at about 190° F. is added to make about four gallons. The mixture thus far compounded is first thoroughly stirred and then the sodium hydroxide is added and the whole mass is then again stirred until all of the constituents are thoroughly dissolved. The composition or mixture is then allowed to cool and deposited in suitable containers. The sodium hydroxide having sodium carbonate mixed therewith prevents the sodium hydroxide from darkening or discoloring the wood. The sodium chloride is used as an ingredient in view of its preservative characteristics and also to lower the freezing temperature of the composition or solution. It is well known that a solution of sodium carbonate, sodium hydroxide and sodium chloride alone would injure the hands, but in view of the paint and varnish removing characteristics of these three ingredients when combined and modified one by the other, it is desired to preserve their efficiency in the attainment of the results sought, but when used alone, they will injure the hands. To overcome this disadvantage, the starch is added and the starch also acts as a binder for the composition or solution to permit it to be practically used on vertical surfaces. The composition is applied by means of a suitable vehicle for holding the same and to enable the painted or varnished surfaces to be treated to be thoroughly covered and saturated. The proportions hereinbefore described will make about four gallons of the mixture, but it will be understood that said proportions may be varied for lesser or greater quantities of the composition.

What is claimed as new is:—

A mixture for removing paint and varnish comprising starch, 24 ounces; sodium carbonate, 3 ounces; chloride of sodium, 6 ounces; 4 gallons of water, and 7 ounces of sodium hydroxide.

In testimony whereof I have hereunto set my hand in presence of two subscribing witnesses.

IDA A. FERRELL.

Witnesses:
SARA YOCOM,
JOHN G. FERRELL.